United States Patent [19]
Yamaoka et al.

[11] Patent Number: 5,947,222
[45] Date of Patent: Sep. 7, 1999

[54] THREE-WHEELED AUTOMOBILE

[75] Inventors: Naoji Yamaoka; Katsumi Kohama; Toshiyuki Hakuno; Takeo Okada; Toshiyuki Higashi; Teruaki Yoshida; Takao Shibayama; Masayoshi Kimura; Yukihiro Yaguchi, all of Sayama, Japan

[73] Assignee: Honda Giken Kogyo Kabushiki Kaisha, Tokyo, Japan

[21] Appl. No.: 08/900,483

[22] Filed: Jul. 25, 1997

[30] Foreign Application Priority Data

Jul. 31, 1996 [JP] Japan .................................. 8-202281
Jul. 31, 1996 [JP] Japan .................................. 8-202286

[51] Int. Cl.⁶ ...................................................... B62D 61/06
[52] U.S. Cl. ........................ 180/210; 180/211; 296/78.1; 293/1
[58] Field of Search ..................................... 180/210, 211, 180/215, 311, 908, 90.6; 296/78.1, 180.1; 293/1

[56] References Cited

U.S. PATENT DOCUMENTS

| | | | |
|---|---|---|---|
| 1,582,176 | 4/1926 | Haggert, Jr. ............................ | 190/90.6 |
| 1,692,342 | 11/1928 | Miller ....................................... | 180/215 |
| 3,934,670 | 1/1976 | Medalen ................................... | 180/52 |
| 4,372,602 | 2/1983 | Tsuchiya et al. ........................ | 296/78.1 |
| 4,799,568 | 1/1989 | Tanaka ..................................... | 180/219 |
| 4,923,026 | 5/1990 | Shimoyama ............................. | 180/215 |

*Primary Examiner*—J. J. Swann
*Assistant Examiner*—James S. McClellan
*Attorney, Agent, or Firm*—Merchant & Gould

[57] ABSTRACT

A three-wheeled automobile comprises a front cowl for enclosing a front portion of the automobile, and a floor forming a passenger step. The front cowl has on lateral sides thereof rear ends positioned above front wheels of the automobile, and a front end surface positioned forwardly of the front wheels. As a result, a large space is provided between a front wall of the front cowl and a seat. A handle post is provided generally centrally of the floor. The floor has roomy foot platforms located around the handle post. As a result, a space left forwardly of the handle post can be used as a feet accommodating area.

8 Claims, 6 Drawing Sheets

THREE-WHEELED AUTOMOBILE

BACKGROUND OF THE INVENTION

1. Field of the Invention

The present invention relates generally to a three-wheeled automobile having two front wheels and one rear wheel and, in particular, to improvements in a front cowl for covering a frontal part of the three-wheeled automobile and in a floor structure having a foot platform for resting feet of a driver.

2. Description of the Related Art

A three-wheeled automobile of this kind is known from, for example, Japanese Utility Model Kokoku (Post-Exam) Publication No. 39-9805 entitled "Golf Car".

The known three-wheeled automobile includes a front cowl extending from forward to rearward of front wheels for covering a frontal part of a body thereof. A rear portion of the front cowl is positioned rearwardly of the front wheels remotely therefrom. The automobile also includes a floor extending rearwardly from a rear end of the front cowl.

A foot platform for resting feet of a passenger is located forwardly of a deep space defined by the front cowl. A rear end of the front cowl is positioned backwardly of the front wheels. Immediately behind the rear end of the front cowl, there is provided a seat post portion.

In the three-wheeled automobile thus arranged, the rear end of the front cowl is positioned rearwardly of and remotely from the front wheels to thereby provide the aforementioned deep space. However, a laterally-opened space, provided between the seat post portion and the front cowl rear end, is small in front-and-rear length.

This necessitates the passenger foot platform to be positioned internally forwardly of the front cowl. In addition, the distance between the front cowl rear end and the seat post portion is short. As a result, a passenger often experiences difficulty in getting on and off the automobile. There is a great demand that the vehicle of this type be designed such that a passenger can get on and off the vehicle easily without paying any particular attention and avoid getting his feet caught.

The front cowl extends from forward to rearward of the front wheels, as mentioned above, and thus has a large configuration. In addition, the cowl is normally made from a resinous material. Consequently, there is an inconvenience such that it exhibits poor moldability.

Additionally, it is necessary for the front cowl to have front fenders on both sides thereof for covering the right and left front wheels. If such front fenders are formed integrally with the the front cowl, the front cowl will become larger in size and its moldability will worsen. To this end, one may desire that the front fenders be formed separately from the front cowl. However, this will increase the number of required parts and man hours for assemblage.

The present invention has been made to avoid the foregoing inconveniences. Researches have been performed by the present inventors as to how to provide for increased ease or readiness to get on and off a three-wheeled automobile having a front cowl at a front side thereof and a seat post portion disposed on a floor thereof, as to how to provide a front cowl being capable of effectively covering a frontal part of the automobile including front wheels and having improved moldability, and as to how to provide front fenders which can effectively cover the front wheels without being formed separately. These researches have led to the present invention.

Relatedly, it should be noted that the three-wheeled automobile described in the aforementioned Kokoku Publication No. 39-9805 has a front floor portion enclosed by the front cowl. The front floor portion is inclined upwardly at an acute angel. Foot pedals on which to rest passenger feet are disposed on both sides of a handle post, which are positioned backwardly of the front wheels.

In the conventional three-wheeled automobile, the foot pedals are provided such that top ends thereof are located on both sides of the handle post. This requires the foot platform to be positioned rearwardly of the handle post. Thus, a space below the handle post is not fully used. Moreover, a space located forwardly of the handle post is left unused, thus presenting a dead space. This dead space results in a prolonged automobile length, that is, the three-wheeled automobile sized up in a front-and-rear direction.

Such length prolongation is undesired in a small-sized three-wheeled automobile from the standpoint of moveability.

It is desirable that the three-wheeled automobile of the described type can be driven with a feel as if driving a two-wheeled vehicle. Thus, from the viewpoint of driveability, improvements are also demanded of the three-wheeled automobile in which the handle post is positioned forwardly of the foot platform and hence the front wheels are positioned forwardly of the foot platform.

SUMMARY OF THE INVENTION

According to a first aspect of the present invention, there is provided a three-wheeled automobile comprising two front wheels provided on both sides of a front portion of a body of the automobile, a single rear wheel provided on a rear portion of the automobile body, a floor provided on the front portion of the automobile body and forming a passenger step, and a front cowl for enclosing the front portion of the automobile body, the front cowl having on both sides thereof rear ends positioned above the front wheels, and a front end surface positioned forwardly of the front wheels.

In the three-wheeled automobile thus arranged, since the front cowl is positioned such that the rear ends of both sides of the front cowl are located generally above the front wheels, it becomes possible to provide an enlarged space between the seat post portion and the front wall of the front cowl, notwithstanding the seat post portion being provided on the floor and the front cowl being disposed forwardly of the seat post portion. Consequently, in a three-wheeled automobile of the type having floor foot platforms, lateral openings for allowing passage of passenger feet are enlarged so that a passenger can get on and off the automobile smoothly and quickly. This leads to a further advantage that such a three-wheeled automobile can be down-sized by keeping its length to a minimum.

Additionally, it becomes possible to effectively cover the front portion of the automobile body including the front wheels to thereby make the front cowl function fully while keeping the longitudinal dimension of the front cowl to a minimum, and to impart increased moldability to the front cowl. This further provides freedom in designing front cowls and hence front cowls with good designs applied thereto.

In a specific form of the invention, the floor has rear halves of front fenders for the front wheels on both sides of a front portion thereof. The front cowl has front halves of the front fenders on rear portions of both sides thereof. The front fenders are formed when rear ends on both sides of the front cowl and front ends on both sides of the floor are connected together.

Since the front halves and rear halves jointly forming the front fenders are integral respectively with the front cowl and the floor, it is not necessary for the front fenders to be produced as separate elements. As a result, it becomes possible to reduce the number of parts required for producing an automobile of the type described. Further, since the front fenders are provided by simply joining the front cowl and the floor together, operations to mount the front fenders are not required, whereby reduction in the cost of manufacture of the automobile can be achieved.

Moreover, since the two portions each constructing a part of each front fender are formed integrally with the front cowl and the floor, the front cowl and the floor exhibit looks of unity. Thus, the resulting front cowl is highly appreciated from a design aspect while it can function well.

According to a second aspect of the present invention, there is provided a three-wheeled automobile comprising two front wheels provided on both sides of a front portion of a body of the automobile, a single rear wheel provided on a rear portion of the automobile body, a floor provided on the front portion of the automobile body and forming a passenger step, a front cowl for enclosing the front portion of the automobile body, a handle post rising from a transversely intermediate portion of the floor for serving as a steering apparatus for the front wheels, and a pair of foot platforms provided on the floor proximately to lateral sides of a proximal portion of the handle post.

Thus, the arrangement according to the second aspect enables effective utilization of the space located forwardly of the handle post, as a feet accommodating space.

The foot platforms are positioned forwardly of the handle post and the front wheels on the floor and not behind them, whereby passenger feet can be rested forwardly on the floor and a passenger seat can be positioned forwardly on the automobile. Therefore, the length of the three-wheeled automobile can be kept to a minimum.

Additionally, since passenger feet can be placed between the two front wheels, it becomes possible to down-size the vehicle, to impart increased driveability to the vehicle, and to make steering operations easier.

Furthermore, even when the vehicle has a reduced length, a large space is provided for accommodating passenger feet, thus enabling a passenger to get on and off the vehicle smoothly and quickly.

Preferably, the floor having the foot platforms is attached to a frame member which supports the handle post, whereby a floor support construction is simplified and does not need to be provided separately.

Desirably, that portion of the floor which has the foot platforms is inclined forwardly upwardly so that a passenger can sit firm by pressing his feet against the platforms. This is particularly advantageous when performing a braking operation, because the passenger feet are prevented from skidding forward.

According to a third aspect of the present invention, there is provided a three-wheeled automobile comprising two front wheels provided on both sides of a front portion of a body of the automobile, a single rear wheel provided on a rear portion of the automobile body, a floor provided on the front portion of the automobile body and forming a passenger step, a front cowl for enclosing the front portion of the automobile body, the floor being enclosed on a front side and both lateral sides by the front cowl, a handle post rising from a transversely intermediate portion of the floor for serving as a steering apparatus for the front wheels, a passenger feet accommodating space defined by the floor and the front cowl enclosing the floor and located around the handle post, and a pair of foot platforms provided on the floor proximately to lateral sides of a proximal portion of the handle post.

This arrangement provides a feet accommodating space around the handle post rising from the floor, which is enclosed by the front cowl and has a large frontward depth.

BRIEF DESCRIPTION OF THE DRAWINGS

One preferred embodiment of the present invention will now be explained in detail, by way of example, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
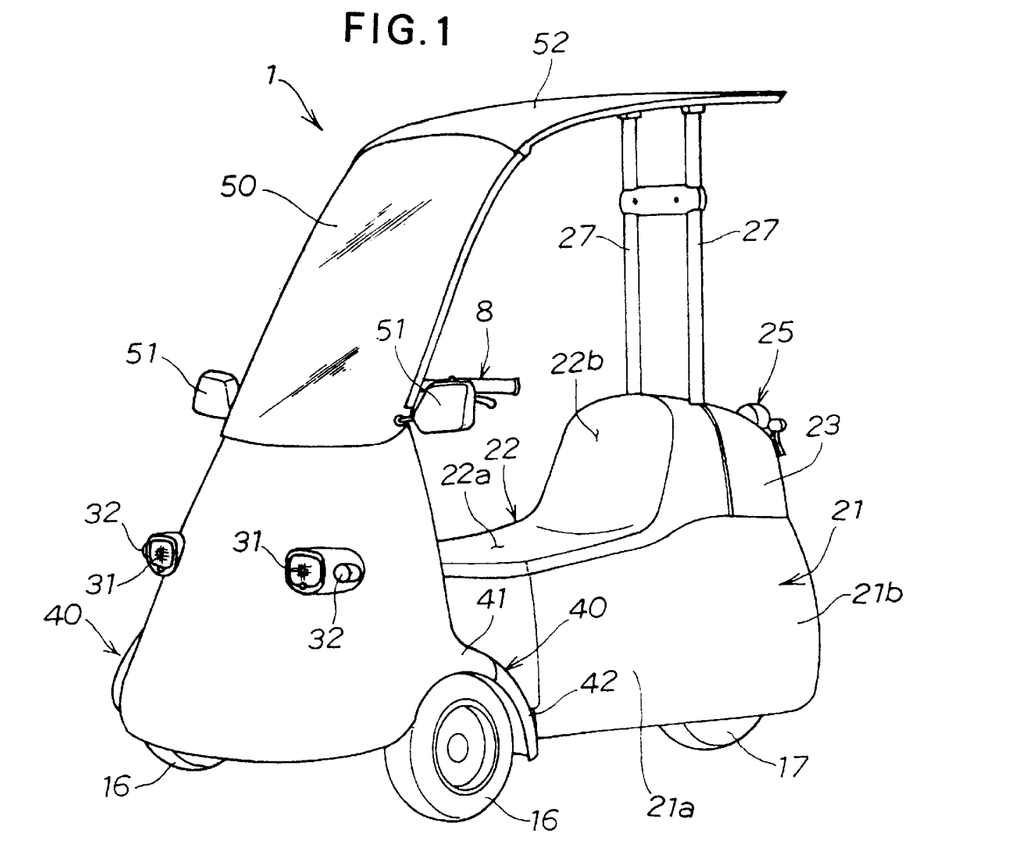
FIG. 1 is a schematic perspective view illustrating a profile of a three-wheeled automobile having a front cowl according to the present invention.
Figure 2:
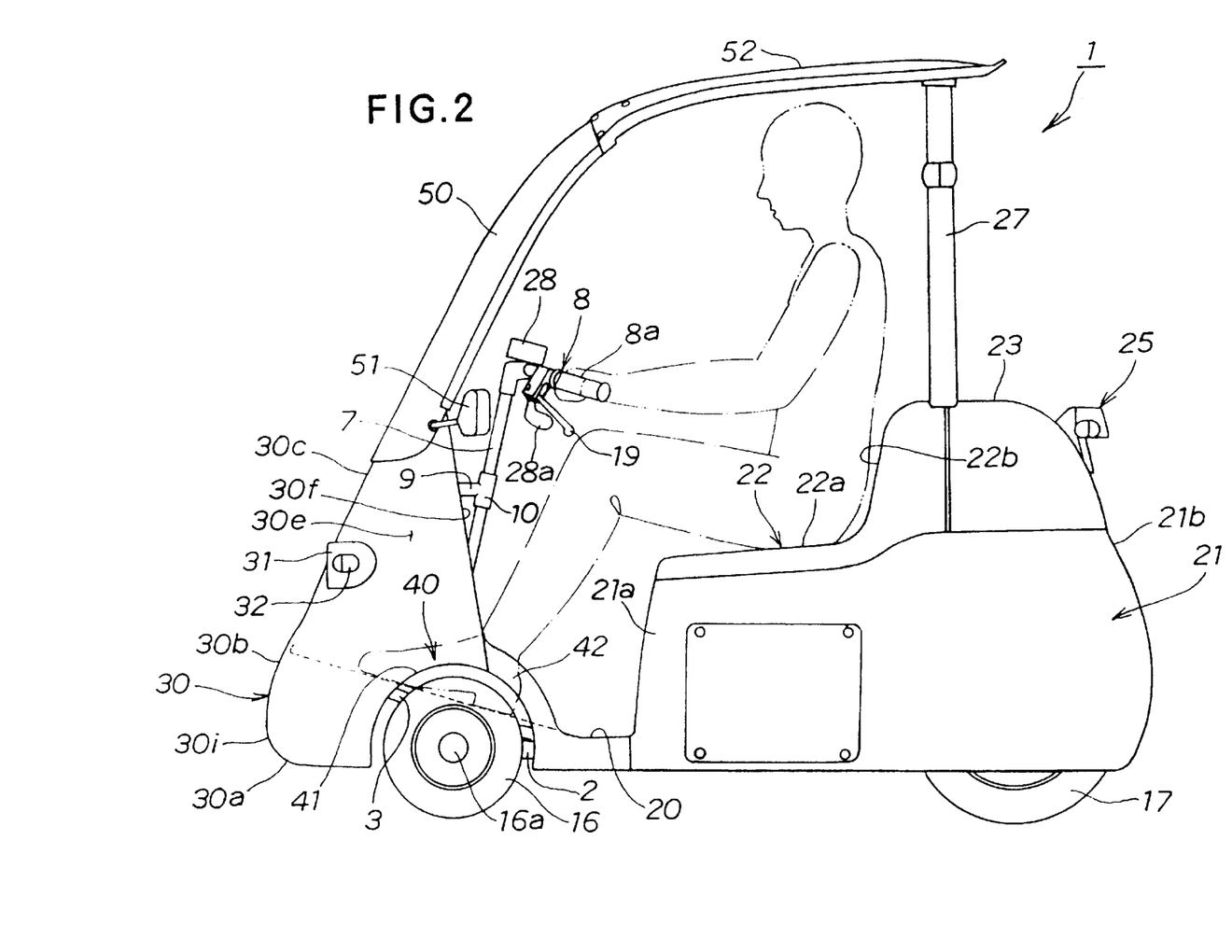
FIG. 2 is a schematic side view of the three-wheeled automobile of FIG. 1.
Figure 3:
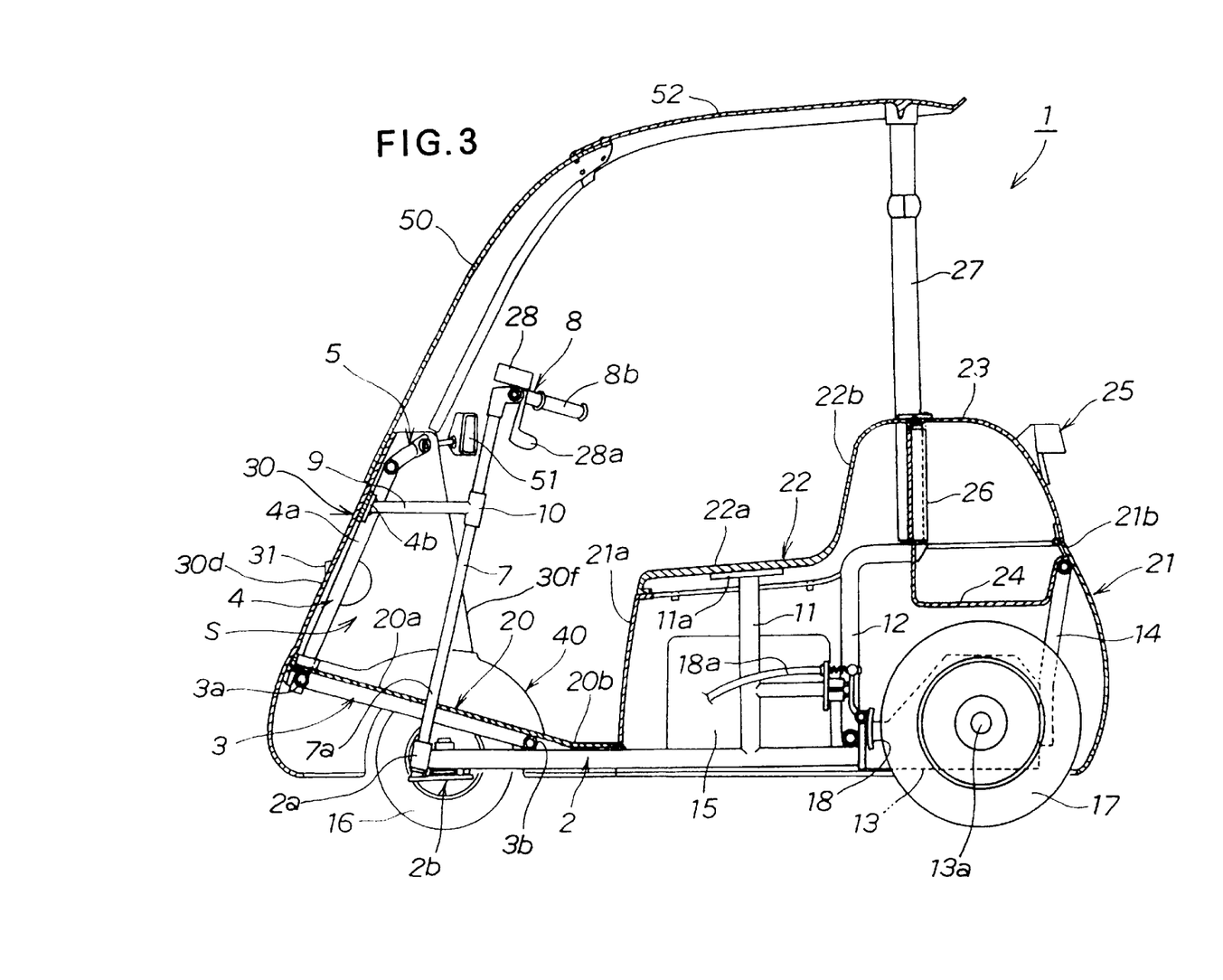
FIG. 3 is a cross-sectional view taken longitudinally of the three-wheeled automobile.

Referring to FIG. 1 to FIG. 4, a three-wheeled automobile, generally designated by reference numeral 1, is shown. As best shown in FIG. 3, the three-wheeled automobile 1 has a pair of right and left main frames 2 at a lower level of the automobile, which are formed from pipe materials and extend in a front-and-rear direction. Joined to front portions of the main frames are two front frames 3 formed from pipe materials and inclined forwardly upwardly. Front ends of the front frames 3 are connected by a cross member 3a extending transversely therebetween and the rear ends of the front frames 3 are likewise connected by a cross member 3b. A channel-shaped support frame 4 is connected to the front ends of the front frames 3. The support frame 4 supports a front cowl 30 thereon. The support frame 4 also has vertical members 4a, 4a formed from pipe materials and extending upwardly from the front ends of the front frame 3, and a generally U-shaped support arm 5 connected at bent portions 5a, 5a thereof to upper ends of the vertical members 4a, 4a.

Handle post 7 in the form of a pipe is disposed transversely centrally of the front ends of the main frames 2 such that an upper portion thereof is inclined slightly rearwardly.

Cross member 4b extends between upper portions of the the right and left vertical members 4a, 4a and connected at ends thereto. A stay 9 is connected at an end to the cross member 4b and extends rearwardly therefrom. The stay 9 has a support pipe 10 at a rear end thereof, which is formed integrally therewith. The support pipe 10 supports the handle post 7.

Figure 5:
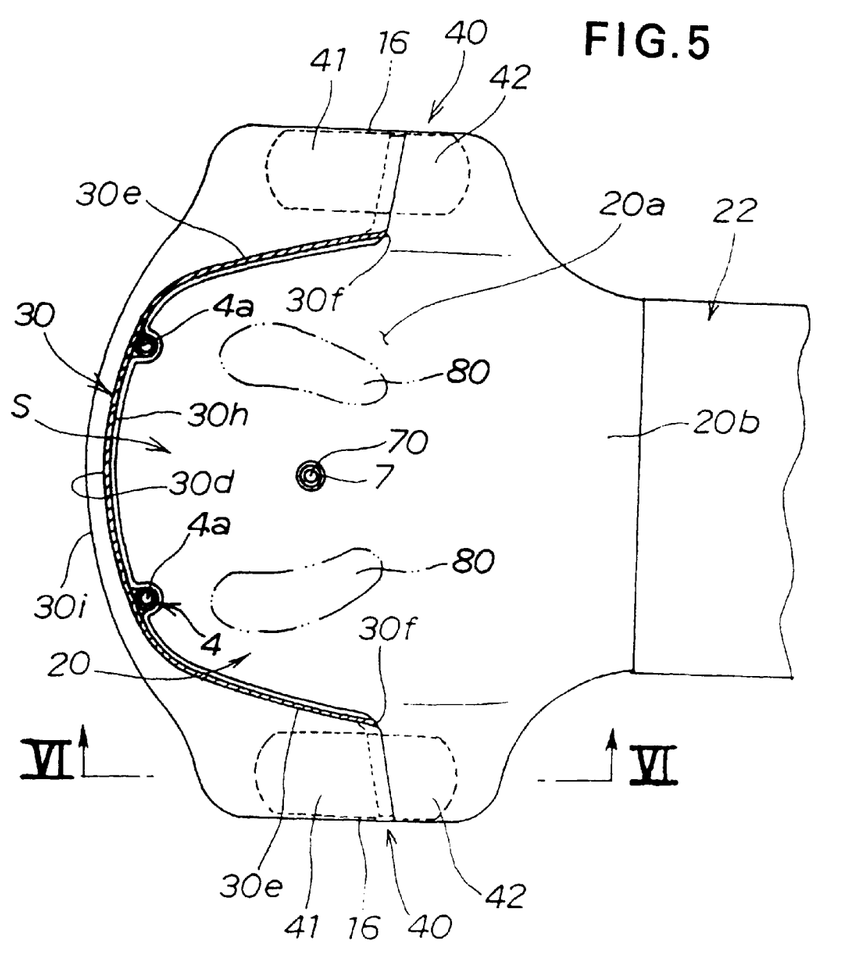
FIG. 5 is a transverse top plan view of a frontal part of the three-wheeled automobile.

Turning now to FIG. 5, a steering shaft 70 is rotatably disposed within the handle post 7 and passes vertically therethrough. The steering shaft 70 has a bar handle 8 connected to an upper end thereof.

Figure 4:
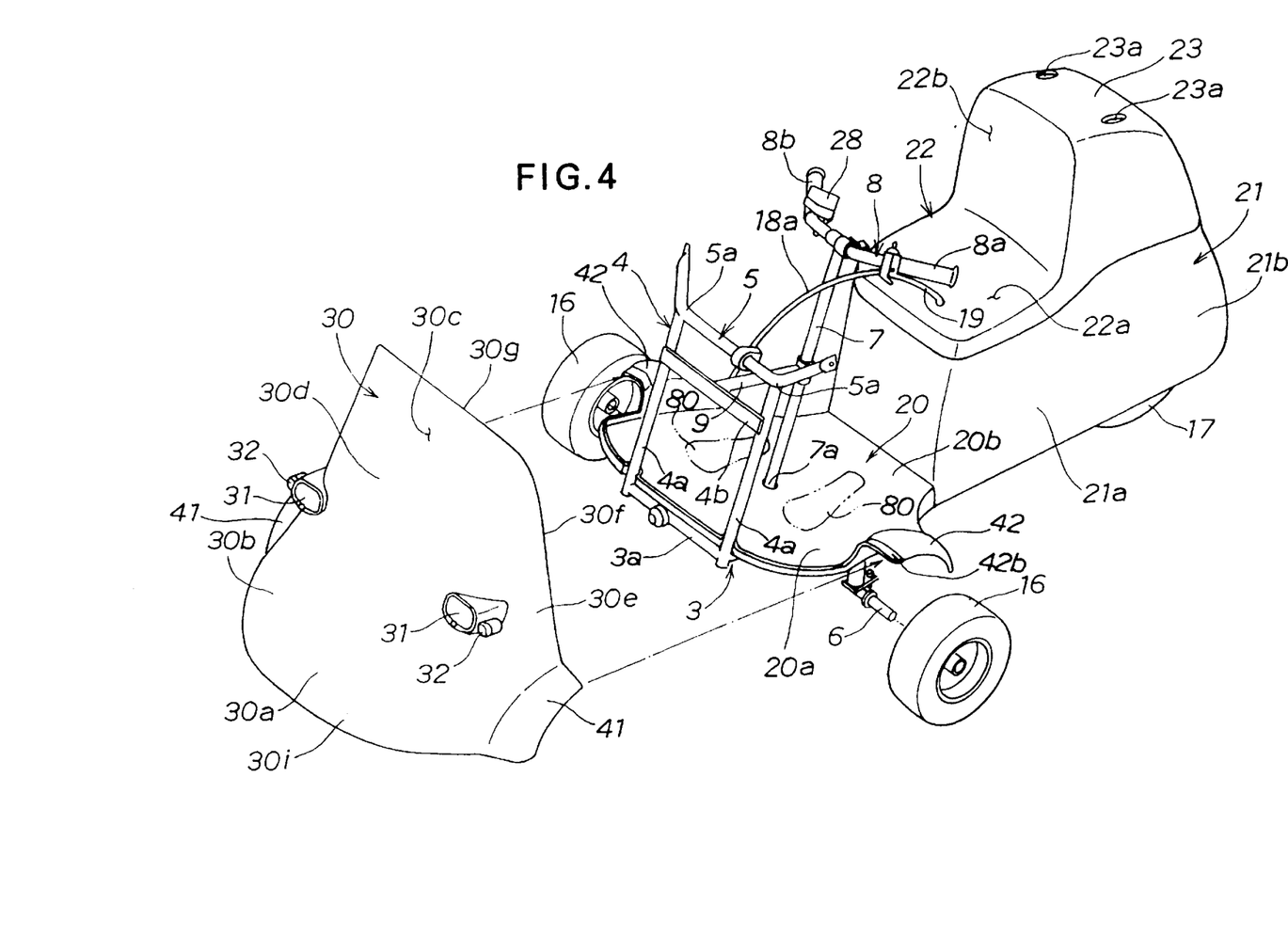
FIG. 4 is an exploded perspective view illustrating the three-wheeled automobile with the front cowl removed.

Lower end of the handle post 7 is supported by a support pipe 2a connected to the front ends of the main frames 2. Lower end of the steering shaft 70 is connected to right and left knuckle arms 6, 6, as shown in FIG. 4 (only one shown), via steering mechanisms 2b such as tie rods. By operating the bar handle 8 to turn the steering shaft 70, right and left front wheels 16, 16 can be steered.

On rear portions of the main frames 2, there is provided a seat post 11 formed from a pipe material and extending vertically. Behind the seat post 11, there is disposed a pair of right and left inverted L-shaped rear frames 12 extending vertically. Provided below the rear frames 12 is a power unit 13 including an electric motor. A stay 14 for supporting a rear cowl 21 is connected to a rear end of the power unit 13. A battery 15 is disposed on rear portions of the main frames 2.

The front wheels 16, 16 are connected to the knuckle arms 6, 6. A single rear wheel 17 is connected to an axle 13a of the power unit 13. The front wheels 16, 16 are steered to control the direction of the automobile. The rear wheel 17 is driven to propel the automobile.

In FIG. 3, reference numeral 18 designates a brake for the rear wheel 17, which is positioned forwardly of the rear wheel tire 17. The brake 18 includes a swingable piece with a base portion connected pivotally to the rear frames 12. Pulling a brake wire 18a causes the brake 18 to act on the rear wheel 17 to thereby apply a braking action to the automobile. The brake wire 18a is connected to a brake lever 19 attached to a handle grip 8a on a left side of the handle 8, as shown in FIG. 4.

On the front frames 3, a floor 20 in the form of a plate is placed. A rear portion of the floor 20 extends over the main frames 2. As best shown in FIG. 4, the floor 20 has an enlarged width portion 20a having a width enlarged transversely (in a right-and-left direction) and extending from a front portion to an intermediate portion of the floor 20, and a reduced width portion 20b having a width reduced transversely and continuing with the enlarged width portion rearwardly. The enlarged width portion 20a and the reduced width portion 20b are formed integrally. As shown in FIG. 3, the enlarged width portion 20a is inclined forwardly upwardly like the front frames 3.

As shown in FIG. 4, a seat support plate 11a is placed on an upper end of the seat post 11. Extending upwardly from a rear end of the floor 20 is a front portion 21a of the rear cowl 21 serving also as a cover for the seat post 11. The rear cowl 21 covers the seat post 11, rear frames 12, stay 14, power unit 13 and an upper half of the rear wheel 17. A seat 22 extends from an upper end of the front portion 21a to a rear portion 21b of the rear cowl 21.

Underside of a seat cushion 22a of the seat 22 is supported by the support plate 11a of the seat post 11. A backrest 22b is formed integrally with the seat cushion 22a and extends upwardly from a rear end of the latter. Behind the backrest 22b, there is disposed a trunk lid 23 capable of opening and closing actions. The trunk lid 23 is located above the rear portion 21b of the rear cowl 21. Below the trunk lid 23, there is provided a dish-like luggage box 24 within the rear cowl rear portion 21b. Luggage and tools can be stored in the box 24.

On a rear portion of the trunk lid 23, a tail lamp unit 25 having a brake lamp and a winker lamp is provided. A pair of right and left support pipes 26, 26 is provided vertically on rear portions of the right and left rear frames 12. Provided on the support pipes 26, 26 are roof stays 27, 27 for supporting a rear portion of a roof panel 52 discussed below. The roof stays 27, 27 pass upwardly through apertures 23a, 23a (see FIG. 4) formed in the trunk lid 23.

As shown in FIG. 3 and FIG. 4, the right handle grip 8b has a speed controller 28 for controlling the number of rotation of the electric motor, that is, the speed of the automobile, and a speed control lever 28a corresponding to a throttle lever.

Front cowl 30 has a front wall 30d and side walls 30e, 30e formed integrally with the front wall 30d and extending rearwardly from both sides of the front wall 30d, and is substantially U-shaped in horizontal section (see FIG. 5). Upper half 30c of the front wall 30d is inclined rearwardly relative to a lower half 30b of the front wall 30d. The front wall 30d also has a lower portion 30a bulged forwardly.

Upper portions of rear edges 30f, 30f of the side walls 30e, 30e of the front cowl 30 are inclined forwardly of the automobile body, as shown in FIG. 2. An upper edge 30g (FIG. 4) of the front cowl 30 is positioned lower than the handle 8.

As shown in FIG. 5, a rear surface 30h of the front wall 30d of the front cowl 30 is supported at right and left sides thereof by the right and left vertical members 4a, 4a of the support frame 4, whereby the front cowl 30 is mounted to the support frame 4.

Front cowl 30 is attached to the front part of the vehicle, as explained above. Lower portions of the side walls 30e, 30e forming the rear part of the front cowl 30 are located above the front wheels 16, as best shown in FIG. 2. In the described embodiment, lower ends of the rear edges 30f, 30f of the front cowl 30 are positioned above an axle 16a of the front wheels 16.

In the rear portion of the front cowl 30, the lower ends of the rear edges 30f, 30f take the rearmost positions. The higher other portions in the front cowl rear portion are positioned, the more they are located forwardly. Top end 30i of the lower portion 30a forming the frontal part of front cowl 30 is provided such that it is located forwardly of the front wheels 16.

As best shown in FIG. 1 and FIG. 4, the front cowl 30 has right and left headlights 31, 31 at a heightwise (height direction) center thereof. The headlights 31, 31 include respective direction indicators 32, 32 provided on outside thereof.

Figure 6:
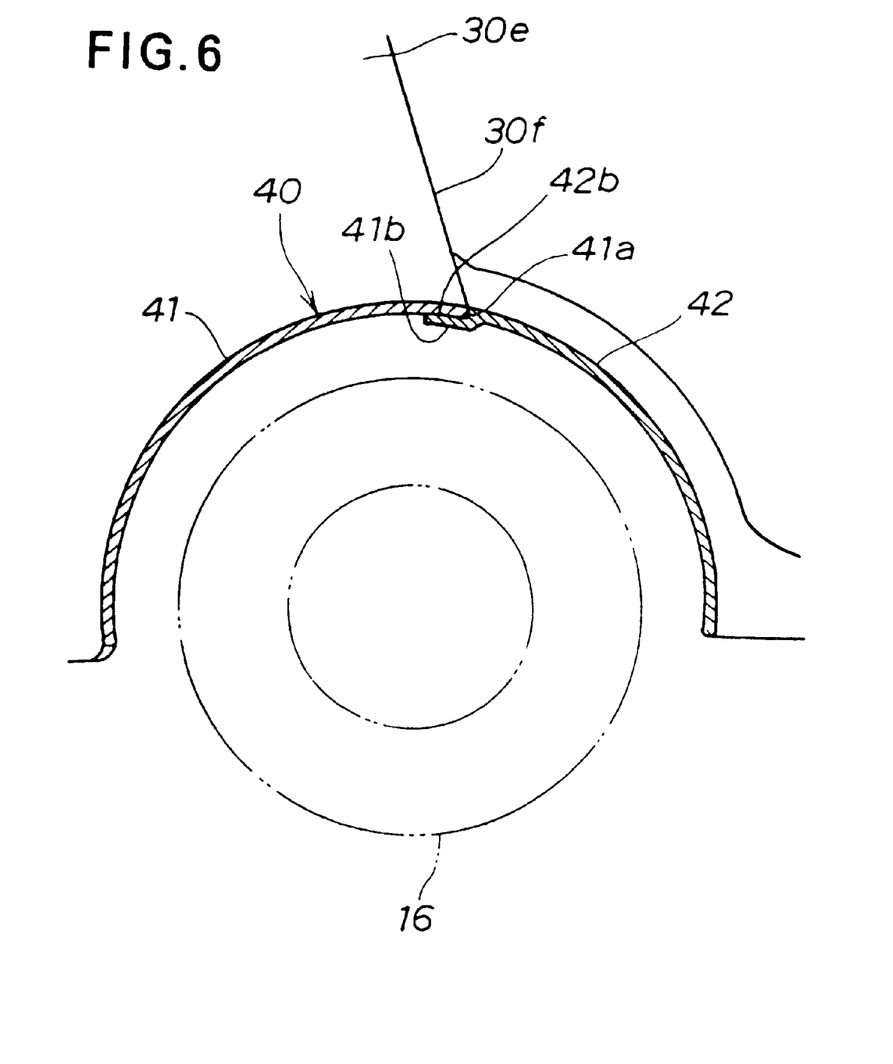
FIG. 6 is a cross-sectional view taken along line VI—VI of FIG. 5.

At lower right and left portions, the front cowl 30 also has front fender front halves 41, 41 formed integrally therewith and projecting outwardly, as shown in FIG. 4 and FIG. 5. Each front fender front half 41 occupies an area of the front cowl 30 defined between a portion proximate to a front portion of the front cowl 30 and a rear end of the front cowl 30. As shown in FIG. 6, each front fender front half 41 has an arc-shaped configuration as seen from sideways. The arc shape corresponds generally to one fourth of a circle. The rear edge 30f of the side wall 30a extends upwardly from a transverse inner edge of a rear end 41a of the front fender front half 41, with an upper portion of the rear edge 30f being inclined forwardly.

Floor 20 has front fender rear halves 42, 42 at longitudinal (front-and-rear direction) centers on both sides thereof, which are formed integrally therewith and projecting outwardly therefrom, as shown in FIG. 5. The rear halves 42, 42 have an arc-shaped configuration corresponding generally to one fourth of a circle so that they are symmetrical with the front fender front halves 41, 41.

Each rear half 42 has a stepped portion 42b (see FIGS. 4 and 6) formed at a front portion thereof. The rear end 41b of the front half 41 is laid upon an upper surface of the stepped portion 42b such that an outer peripheral surface of the front half 41 becomes flush with an outer peripheral surface of the rear half 42.

By thus laying a portion of the front half 41 of the front cowl 30 and a portion of the rear half 42 of the floor 20 one over the other, a front fender 40 is provided.

That is, since the front half 41 and rear half 42, forming the front fender 40 jointly, are respectively integral with the front cowl 30 and floor 20, it is no longer necessary to provide the front fender 40 as a separate element, thus rendering the front fender mount operation easy.

As can be seen from FIG. 5, the enlarged width portion 20a of the floor 20 has a width larger than a transverse width of the front frames 3 (FIG. 4) and extends transversely outwardly as far as about the inner sides of the right and left front wheels 16, 16. As seen from FIG. 4, the reduced width portion 20b has a width identical with a width of the frontal part of the rear cowl 21 and is disposed horizontally on the main frames 2. The handle post 7 is positioned generally centrally of the enlarged width portion 20a and projects upwardly from the floor 20. More specifically, the handle post 7 is vertically disposed on a portion of the floor 20, which is located between and generally equidistant from the right and left front wheels 16, 16, and hence over a substantially intermediate portion of the axle of the front wheels 16, 16.

Front half of the enlarged width portion 20a of the floor 20 is enclosed by the front cowl 30. As a result, there is provided a space S at an area positioned forwardly and on both sides of a handle post proximal portion 7a projecting out from the floor 20.

On both sides of the handle post proximal portion 7a, there are provided right and left foot platforms 80, 80. It is desirable that these foot platforms 80, 80 are so positioned as to allow a passenger to rest his feet thereon smoothly and comfortably from sideways without taking any special posture. For this purpose, the right and left foot platforms 80, 80 are spaced a predetermined distance from both sides of the handle post 7. The foot platforms 80, 80 are also positioned so that longitudinally central portions of the passenger feet are aligned laterally with the handle post proximal portion 7a. Front halves of the foot platforms 80, 80 are located within a front portion of the space S defined by the front cowl 30. Both sides of the foot platforms 80, 80 are hidden by the side portions 30e, 30e of the front cowl 30 so that they are invisible from outside. Similarly, front sides of the foot platforms 80, 80 are hidden by front wall 30d of the front cowl 30 so that they are invisible from outside.

Although they are indicated by phantom lines in FIG. 5, the foot platforms 80, 80 should not necessarily be marked as such. If is sufficient if the space S on which to rest the passenger feet is provided at an area around the handle post proximal portion 7a. However, the foot platforms 80, 80 may carry markings indicative of the foot platforms or embosses for preventing slippage.

In FIG. 1 to FIG. 3, reference numeral 50 designates a windscreen made from a transparent material so that a driver can see forward therethrough. The windscreen 50 mounted to an upper portion of the front cowl 30. Upper portion of the windscreen 50 is bent rearwardly. At lower right and left portions of the windscreen 50, there are provided side rearview mirrors 51, 51. Reference numeral 52 designates a roof mounted to an upper portion of the windscreen. A rear portion of the roof 52 is supported by the aforementioned roof stays 27, 27.

Although the present invention has been described as being embodied in an electrically-operated three-wheeled automobile, it should not be limited to such an application and may also be applied to automobiles with engines in which gasoline is used as fuel. It will be readily appreciated by skilled artisans that the three-wheeled automobile according to the present invention should not necessarily be provided with the roof and windscreen.

In the illustrated embodiment, the front half 41 of the front fender 40 has been described as being laid upon the rear half 42 of the fender. Alternatively, these halves may be connected by a screw or other like fastenings.

As thus far explained in detail, in the three-wheeled automobile according to the present invention, the front cowl provided for covering the frontal part of the automobile is positioned such that the rear ends of both sides of the front cowl are located generally above the front wheels while the front end of the front cowl is located forwardly of the front wheels.

With this arrangement, it becomes possible to provide an enlarged space between the seat post portion and the front wall of the front cowl, notwithstanding the seat post portion being provided on the floor and the front cowl being disposed forwardly of the seat post portion. Consequently, in a three-wheeled automobile of the type having floor foot platforms, lateral openings for allowing passage of passenger feet are enlarged so that a passenger can get on and off the automobile smoothly and quickly. This leads to a further advantage that such a three-wheeled automobile can be down-sized by keeping its length to a minimum.

Further, because the handle post is located generally centrally of the floor of the automobile and because the foot platforms are positioned about the proximal portion of the handle post closely thereto, floor space left forwardly of the handle post can also be used effectively for accommodating passenger feet.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A three-wheeled automobile comprising:

two front wheels provided on both sides of a front portion of a body of said automobile;

a single rear wheel provided on a rear portion of said automobile body;

a floor provided on said front portion of said automobile body and forming a passenger step;

a front cowl for enclosing said front portion of said automobile body, said front cowl having on both sides thereof front cowl fender portions rear ends positioned above said front wheels, and a front end located forwardly of said front wheels, said floor having a front portion enclosed on a front side and both lateral sides by said front cowl and having a floor fender portion with front ends connected together with the rear ends of the front cowl fender portions;

a handle post rising from a transversely intermediate portion of said front portion of said floor for serving as a steering apparatus for said front wheels, said handle post being vertically located over a substantially intermediate portion of a common axis of rotation of said front wheels;

a passenger feet accommodating space defined by said front portion of said floor and said front cowl enclosing said front portion of said floor and located forwardly and on both sides of a proximal portion of said handle post; and a pair of foot platforms provided on said front portion of said floor proximately to lateral sides of said proximal portion of said handle post.

2. A three-wheeled automobile according to claim 1, wherein said floor has rear halves of front fenders for said front wheels on both sides of a front portion thereof, said front cowl has front halves of said front fenders on rear portions of both sides thereof, and said front fenders are formed when rear ends on both sides of said front cowl and front ends on both sides of said floor are connected together, and wherein said rear halves of said front fenders are integral with said floor and project outwardly from said floor, and said front halves of said front fenders are integral with said front cowl and project outwardly from said front cowl.

3. A three-wheeled automobile according to claim 1, wherein said floor having said foot platforms is attached to a frame member which supports said handle post.

4. A three-wheeled automobile according to claim 2, wherein said floor has an enlarged width portion having a width enlarged transversely and extending from a front end to an intermediate portion of said floor, and a reduced width portion having a width reduced transversely and continuing with said enlarged width portion rearwardly, and wherein said rear halves of said front fenders are located at longitudinal centers on both sides of said floor and integral with said enlarged width portion.

5. A three-wheeled automobile according to claim 2, wherein said rear ends of said front cowl are vertically above said front wheels, said front halves of said front fenders have an arc-shape configuration corresponding generally to one fourth of a circle, and said rear halves of said front fenders have an arc-shape configuration corresponding generally to one fourth of said circle and symmetrical with said front halves of said front fender.

6. A three-wheeled automobile according to claim 4, wherein said enlarged width portion of said floor is inclined forwardly upwardly.

7. A three-wheeled automobile according to claim 4, wherein said rear ends of said front cowl are vertically above said front wheels, said front halves of said front fenders have an arc-shape configuration corresponding generally to one fourth of a circle, and said rear halves of said front fenders have an arc-shape configuration corresponding generally to one fourth of said circle and symmetrical with said front halves of said front fender.

8. A three-wheeled automobile according to claim 5, wherein one of a rear end portion of each of said front halves of said front fenders and a front end portion of a corresponding one of said rear halves of said front fenders has a stepped portion, and the other of said rear end portion of each said front half of said front fenders and said front end portion of said corresponding rear half of said front fenders is laid upon an upper surface of said stepped portion so that an outer peripheral surface of said front half becomes flush with an outer peripheral surface of said corresponding rear half.

* * * * *